Patented Sept. 4, 1934

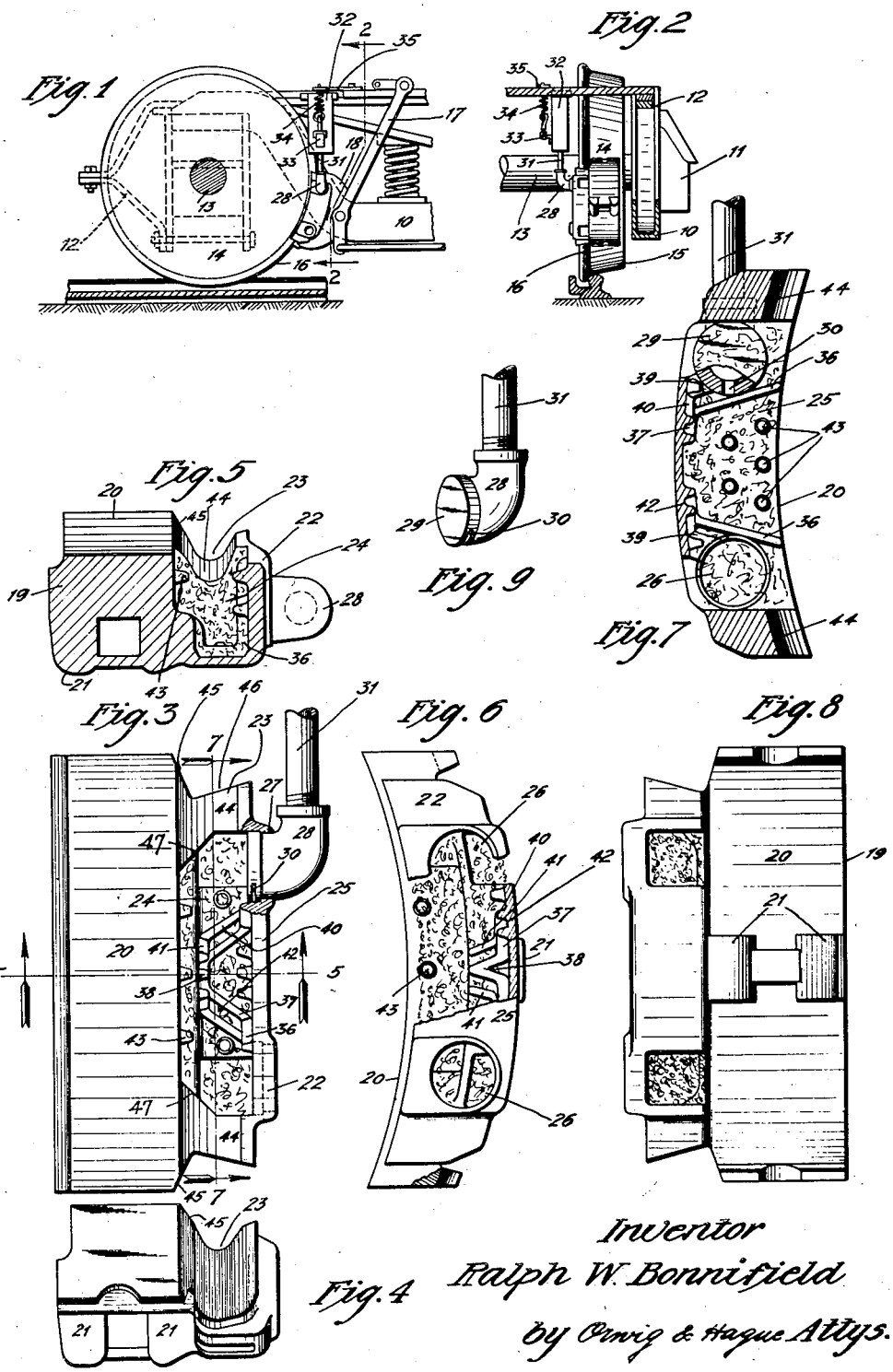

1,972,371

UNITED STATES PATENT OFFICE 1,972,371

BRAKE SHOE

Ralph W. Bonnifield, Des Moines, Iowa

Application November 9, 1931, Serial No. 573,801

12 Claims. (Cl. 184—3)

The object of this invention is to provide an improved brake shoe adapted to be used in place of the ordinary brake shoe without altering or changing the brake shoe supports, and in connection therewith means for lubricating the flange of a wheel to which the brake shoe is applied, and in connection therewith means whereby the lubricant may be uniformly spread to the flange without being spread on the tread portion of the wheel.

More specifically it is the object of my invention to provide a simple brake shoe having a flange engaging portion provided with a recess for carrying fibrous material for spreading a lubricant to the contact surfaces of the wheel flange, and in connection therewith improved means for feeding the lubricant to the fibrous material in a uniform manner and only in quantities to replace the lubricant removal by the flange.

A further object is to provide in a brake shoe of the type above referred to and employing a lubricant container improved means for easily and quickly placing the container in operative relation with the shoe when the shoe is either end up.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a sectional view of a portion of a railway truck showing the manner in which my improved brake shoe is applied to one wheel of the truck.

Figure 2 is a detail sectional view taken on the line 2—2 of Figure 1.

Figure 3 is a front elevation of my improved shoe, a portion being shown in section to illustrate the manner in which the supply pipe is mounted therein.

Figure 4 is a bottom view of Figure 3.

Figure 5 is a detail sectional view taken on the line 5—5 of Figure 3.

Figure 6 is a side elevation of the shoe, a portion being broken away.

Figure 7 is a detail sectional view taken on the line 7—7 of Figure 3.

Figure 8 is a back view of the shoe; and

Figure 9 is a detail perspective view of the feed pipe.

In the drawing I have used the reference numeral 10 to indicate a truck frame having a journal boxing 11 supported by the usual guides 12. Said boxing carries an axle 13 to which a flanged wheel 14 is fixed. Said wheel comprises a tread portion 15 and a flange portion 16.

Carried by the frame 10 is a brake hanger 17, the lower end of which carries a brake head 18 designed to carry a brake shoe. The head 18 and the hanger 17 are of the ordinary construction.

My improved shoe comprises a body portion 19 having a contact surface 20 designed to engage the tread portion 15 of the wheel 14. The back portion of the body 19 has lugs 21 by means of which the member 20 is fixed to the head 18 in the usual manner. The contact surface 20 is curved to fit the contour of the tread portion of the wheel.

The body 19 has formed adjacent to its inner edge a portion 22, the front face of which is curved and provided with a groove 23 for fitting the contour of the flange 16. The member 22 is also provided with a recess 24. The outer wall 25 of the portion 22 has an opening 26 near each end, the outer ends of the openings terminating in an inwardly extending flange portion 27. Each of said openings is designed to receive and support an elbow 28 of a pipe fitting. One end of the elbow 28 is larger than the other, the enlarged portion of said elbow being provided with a cap 29 for closing said end. The lower edge of the cap 29 has a slot 30 communicating with the interior of the elbow.

The openings 26 are of such size as to permit the elbow 28 to be easily placed in position or removed by simply rotating the elbow and pushing it inwardly, permitting the enlarged end to move forwardly through the open end of the recess 24. The smaller end of the elbow is then withdrawn through said opening. The elbow may be replaced by a reverse operation, and when in position supported in the manner illustrated in Figure 3, with the inner edge of the cap portion 29 resting against the inner edge of the flange 27. Thus means is provided for preventing the elbow from being pulled outwardly through the opening 26.

The smaller end of the elbow is connected to a vertically arranged pipe 31, the upper end of which makes connection with the lower end of a lubricant container 32, said container having an inwardly extending lug 33 to which one end of a spring 34 is connected. The opposite end of said spring is carried by a bar 35 supported by the truck frame 10 in such a manner that the pipe 31 and the container 32 are yieldably supported in an upright position, as illustrated in Figures 1 and 2, Thus means is provided whereby heavy lubricant, such as heavy axle grease, may be carried by the container, a portion of which will move downwardly through the pipe 31 into the elbow 28 and through the slot 30 to the interior of the recess 24, said downward movement being increased by vibration of the container 32 and pipe 31.

By making the slot 30 comparatively narrow, it will be seen that the heavy lubricant will not flow downwardly through said slot only after the brake shoe and the elbow 29 have become warmed or heated by friction, at which time a portion of the lubricant will be warmed sufficiently to permit a small amount to flow downwardly through the slot 30 into said recess.

The said recess 24 is designed to be filled with a fibrous material such as waste, and when so filled caused to engage the surfaces of the flange 16 at the time the brake is applied, so that the waste within the recess which has become saturated with the lubricant will then spread a thin layer of the lubricant to the flanged surfaces.

In order to provide means whereby the comparatively heavy grease will be carried to the outer surface of the fibrous material, and at a point substantially midway between the upper and lower end of the recess, I have provided a rib 36 carried by the inner surface of the outer wall of the recess, said rib being inclined downwardly and rearwardly and located immediately below the cap portion 29, as clearly illustrated in Figure 7. The outer end of the rib 36 terminates in a transversely arranged rib portion 37 formed in the back wall of the recess. This rib is inclined downwardly as illustrated in Figure 3, the inner end of which finally terminates in a V-shaped block 38 mounted on the inner wall of the recess.

Rib portions 39, 40 and 41 are also mounted on the outer, back and inside walls parallel with the ribs 36, 37 and 38, so that a groove 42 is formed between said ribs. The rib 39 has one end terminating adjacent to the cap 29 so that grease flowing downwardly through the slot 30 will pass through the groove 42 to a point adjacent to the central portion of the inner wall of the recess, or adjacent to the apex end of the member 37.

It will be seen that the ribs provide means for supporting the packing away from the wall members between said ribs, so that a comparatively open path or duct is formed, thereby providing means whereby the grease may be delivered quite rapidly to a point near the center of the fibrous packing and inside of the outer surface of said packing.

One set of the ribs above described extends from each of the openings 26 to the center of the inner wall of the recess in such a manner that the brake shoe may be used either end up and when the elbow 28 is applied to the upper opening 26, means will be provided for feeding grease downwardly and toward the center of the packing. The grease will then be diffused through the packing so it will be uniformly applied to the flange at the time the brake shoe is set.

Lugs 43 are also provided on the side walls and project inwardly to assist in holding the packing in place.

Referring to Figure 3 it will be seen that the open end of the recess 24 is such as to provide a comparatively narrow front and end portions 44, which will wear away the same amount as the shoe 20. The area of the members 44 is a great deal less than the area of the member 20, so that in case the members 44 fail to wear away as fast as the member 20, due to the fact that said members 44 are more or less lubricated, then it will be seen that the pressure per square inch as applied to the members 44 will be a great deal more than the pressure applied to the member 20, causing the lubricant on the surfaces of the members 44 to become heated and burned, permitting the said portions to wear away sufficiently to permit the shoes 20 to be set.

It will further be seen that the packing would tend to distribute the lubricant quite evenly over the surface of the flange 16, the inner surface of the flange as well as the outer surface, so that danger of the lubricant flowing on the shoe portion 20 might be encountered. To overcome this difficulty, I have notched the upper and lower ends of the portion 22 so that transversely arranged and outwardly inclined portions 45 are provided. The inner ends of the portions 45 terminate near the central portion of the inner surface of the flange, or midway between the throat of the flange and its periphery, while the outer end of the inclined portion terminates in the upper and lower ends of the shoe 20.

The lower edges of the members 44 are provided with inclined portions 47 to assist in spreading lubricant toward the peripheral edge of the flange.

Thus means is provided whereby any excess lubricant tending to flow to the shoe portion 20 will be scraped outwardly toward the periphery of the flange.

Inclined end portions 46 are also provided which have a tendency to move the lubricant inwardly and to prevent the lubricant from running downwardly and outwardly over the top of the portion 22. The end is notched to hold any grease collecting on the upper end of the portion 22 near the center of said end where it will be engaged by the flange.

The upper end of the grease container 35 is so located that it may be easily filled when so desired. The spring 34 yieldably supports the upper end of the container in such a manner that the container will oscillate or vibrate slightly when the truck is in motion to assist in working the comparatively heavy lubricant downwardly in the container and through the pipe 31 and the elbow 28. The lubricant flows only after the brake shoe has become heated by friction and the lubricant is applied to the flange 16 only at such times when the shoe is applied to the tread portion of the wheel, thereby providing means whereby both the inner and outer surfaces of the wheel flange may be lubricated without lubricating the rail on which the wheel travels, or without lubricating the tread portion of the wheel, thereby providing means whereby the life of the flange wheel will be greatly increased, and whereby the undesirable noise created by the wheels when passing curves, and much of the wheel noise at the time the wheels are traveling on a straight track, will be eliminated.

One advantage of my improved brake shoe consists in the fact that a single pattern may be utilized in making brake shoes that will fit wheels on both sides of the truck, and also the front and back wheels of each side of the truck, and which may be easily and quickly placed in the ordinary brake head and secured in the same manner as the ordinary brake shoes now in common use.

Furthermore, the brake shoe being formed of a single casting may be manufactured and sold at comparatively the same cost as the ordinary brake shoes.

Fibrous material such as waste or the like that has been removed from the journal boxes may be utilized in the recess 24 to good advantage, and thereby utilize the packing which heretofore has been discarded after it has been used in the journal boxes a certain length of time, due to the fact that the packing becomes filled with small particles of iron and other foreign substances.

Thus it will be seen that I have provided a brake shoe of simple, durable and inexpensive construction, which may be easily and quickly applied to the ordinary brake head, and when so applied will greatly increase the life of the flanges of the wheels, and thereby eliminate the necessity of removing the wheels and cutting a portion of the tread away to form a new flange surface.

I claim as my invention:

1. The combination of a brake shoe having a recess in its central surface for supporting fibrous material, an opening in each end of one side of said recess and connecting with said recess, a lubricant container, yieldable means for supporting said container in an upright position, and means for detachably connecting the lower end of said container to the upper one of said openings to feed a lubricant from said container to said opening by gravity, the inner surface of the walls of said cavity having grooves leading from both of said openings to a common center point adjacent to the opposite wall whereby a lubricant will flow from said opening to a point near the center of said recess.

2. The combination of a brake shoe having at one side an auxiliary portion designed to fit the contour of a wheel flange and having a recess in its contact surface for supporting fibrous material, an opening in each end of one wall of said recess, a lubricant container, and means for detachably and operatively connecting the lower end of said container with the upper one of said openings, each end of said auxiliary portion being notched to provide laterally extending inclined portions for feeding lubricant outwardly from the throat of a wheel flange toward its peripherial edge as the brake shoe is applied to the tread portion of a wheel.

3. The combination of a brake shoe having an auxiliary portion at one side, a cavity in the central portion of the contact surface of said auxiliary portion, said auxiliary portion being formed to fit the contour of the wheel flange, a fibrous material in said cavity, means for feeding comparatively heavy lubricant to said fibrous material and to the flange of a wheel as the brake shoe is applied to said wheel, and means carried by the upper end of the auxiliary portion for moving excess lubricant toward the peripherial edge of the inner surface of said flange as the brake shoe is applied.

4. The combination of a brake shoe having an auxiliary portion at one side, a recess in the central portion of the contact surface of said auxiliary portion, said auxiliary portion being formed to fit the contour of the wheel flange, a fibrous material in said recess, means for feeding comparatively heavy lubricant to said fibrous material and to the flange of a wheel, as the brake is applied to said wheel, means carried by the upper end of the auxiliary portion for spreading lubricant toward the peripherial edge of the inner face of said flange, and means carried by the lower end of said recess for moving lubricant toward the peripherial edge of said flange.

5. The combination of a brake shoe having an auxiliary portion at one side, said auxiliary portion having a recess in its contact surface, the upper and lower walls of said recess being comparatively thin, the inner faces of which are inclined, said auxiliary portion being formed to fit the contour of the wheel flange, a fibrous material in said recess, and means for feeding comparatively heavy lubricant to said fibrous material and to the flange of a wheel as the brake shoe is applied thereto.

6. The combination of a brake shoe having an auxiliary portion at one side formed to fit the contour of a wheel flange, a cavity in the contact surface of said auxiliary portion, an opening in each end of the outer wall of said cavity, an elbow having one end larger than the other and having its enlarged end supported in the upper one of said openings with the other end of said elbow extending outwardly and upwardly, a pipe in the upper end of said elbow, a grease container on the upper end of said pipe, yieldable means for supporting said container in an upright position, the enlarged end of said elbow having a cap, the lower edge of said elbow being provided with a slot, a flange carried by the inner surface of the walls of said cavity having one end supported beneath the slot of said cap and the other end terminating near the central portion of the opposite wall of said cavity, a second flange parallel with and above the first flange to form a groove between said flanges, and a fibrous material in said recess.

7. The combination of a brake shoe having at one side an auxiliary portion designed to fit the contour of a wheel flange and having a recess in its contact surface for supporting fibrous material, an opening in one end of the wall of said recess, a lubricant container, and means for detachably and operatively connecting the lower end of said container with said opening, each end of said auxiliary portion being notched to provide laterally extending inclined portions for feeding lubricant outwardly from the throat of a wheel flange toward its peripherial edge as the brake shoe is applied to the tread portion of a wheel.

8. The combination of a brake shoe having a recess in its central surface for supporting fibrous material, an opening in one end of one side of said recess and connected with said recess, a lubricant container, means for connecting the lower end of said container to said opening to feed lubricant from said container to said opening, by gravity, the inner surface of the walls of said cavity having grooves leading from said opening to and terminating in the opposite wall of said recess.

9. The combination of a brake shoe having an auxiliary portion at one side, said auxiliary portion having a recess in its contact surface, the upper and lower walls of said recess being comparatively thin to permit said walls to be worn away simultaneously with the wearing of said shoe without the application of excessive brake applying pressure to said parts.

10. The combination of a brake shoe member having a recess in its central portion for supporting fibrous material, an opening in one of the side walls of said recess, a lubricant container, means for delivering a lubricant from said container through said opening into said recess by gravity, the inner surface of a number of the walls of said recess having a groove leading from said opening and terminating in one of the other walls of said recess.

11. The combination of a brake shoe member having a recess in its central portion for supporting fibrous material, one of the walls of said recess having an opening, an elbow having one end larger than the other and rotatively mounted in said opening, the larger end of said elbow being closed and provided with a laterally projecting flange resting against the inner face of said wall, the flange having a peripherial slot communicating with the interior of said elbow, means for feeding a lubricant to the smaller end of said elbow whereby grease will be delivered to the inner surface of said wall, and fibrous material within said recess.

12. In a device of the class described, an elbow having one end closed and larger than the other end, said closed end being circular and adapted to be rotatively mounted in a suitable bearing one side of the enlarged end of said elbow being provided with a circumferential slot communicating with the interior of said elbow.

RALPH W. BONNIFIELD.